United States Patent [19]

Hiraoka et al.

[11] Patent Number: 4,927,915

[45] Date of Patent: May 22, 1990

[54] PROCESS FOR PRODUCING ANTISTATIC POLYMERIC MATERIAL

[75] Inventors: Saburo Hiraoka; Shinji Hama, both of Kasugai; Mitsuo Senga, Nagoya, all of Japan

[73] Assignee: Mitsubishi Rayon Company, Ltd., Tokyo, Japan

[21] Appl. No.: 254,196

[22] Filed: Oct. 6, 1988

[30] Foreign Application Priority Data

| Oct. 6, 1987 | [JP] | Japan | 62-252236 |
| Nov. 4, 1987 | [JP] | Japan | 62-277394 |
| Nov. 16, 1987 | [JP] | Japan | 62-288965 |
| Nov. 24, 1987 | [JP] | Japan | 62-295479 |

[51] Int. Cl.$^5$ .......................... C08F 6/00; C08J 3/00
[52] U.S. Cl. .................................. 528/490; 528/503
[58] Field of Search ............................. 528/490, 503

[56] References Cited

U.S. PATENT DOCUMENTS

| 3,686,019 | 8/1972 | Ohfuka et al. | 117/47 R |
| 4,141,880 | 2/1979 | Nametz et al. | 524/411 |
| 4,298,518 | 11/1981 | Ohmura et al. | 524/101 |
| 4,525,302 | 6/1985 | Phan et al. | 526/264 X |
| 4,571,361 | 2/1986 | Kawaguchi et al. | 428/458 X |

FOREIGN PATENT DOCUMENTS

| 1254288 | 11/1967 | Fed. Rep. of Germany . |
| 1504468 | 10/1969 | Fed. Rep. of Germany . |
| 3625188 | 1/1988 | Fed. Rep. of Germany . |
| 3636606 | 5/1988 | Fed. Rep. of Germany . |
| 34-626 | of 0000 | Japan . |
| 49-100400 | 9/1974 | Japan . |
| 50-29627 | of 1975 | Japan . |
| 54-11369 | of 1979 | Japan . |
| 56-169816 | of 1981 | Japan . |
| 57-11213 | of 1982 | Japan . |
| 57-21517 | of 1982 | Japan . |
| 58-172810 | of 1983 | Japan . |
| 948619 | 2/1964 | United Kingdom . |

OTHER PUBLICATIONS

Textilbericht 1979, Abstract to JP 54011369.
English Abstract to JP 53-24426.
CPI Basic Abstracts 1972, to JP 42604.
CPI Basic Abstracts 1972, to JP 24541.
Derwent Japan Pat. Rep. 1971, 30329S JP 63640.
Derwent Abstracts, 33172W/20 to JP 49120-880.
Derwent Abstracts, 85-300617/48 to JP 60209085.
Derwent Abstracts, 86-308882/47 to JP 61228065.
Derwent Abstracts, 71156/AEF to JP 7243159.
Derwent Abstracts, 45365W/27 to JP 75015822.

*Primary Examiner*—Michael Lusignan
*Attorney, Agent, or Firm*—Oblon, Spivak, McClelland, Maier & Neustadt

[57] ABSTRACT

An antistatic polymeric material having surface electrical resistivity of smaller than $10^{10}$ Ω/□ order and/or half life time of shorter than 40 seconds can be obtained by heat-treating at 60–140° C. for 2–60 minutes a polymeric material in a state moistened with an aqueous solution containing 0.5–5% by weight of stannic chloride.

4 Claims, No Drawings

PROCESS FOR PRODUCING ANTISTATIC POLYMERIC MATERIAL

The present invention relates to a process for producing antistatic polymeric materials, and more particularly to a process for producing antistatic polymeric materials having ah electroconductive layer composed of stannic oxide formed in the surface layer part of the polymeric material.

As production methods for antistatic polymeric materials containing stannic oxide, a process which comprises mixing with a polymer resin fine powders of stannic oxide or fine resin powders containing stannic oxide (Japanese Patent Application Kokai (Laid-Open) Nos. 56-169,816, 57-11,213 and 57-21,517), a process which comprises forming a film containing stannic oxide on the surface of a polymeric material by the use of a resin coating material containing fine powders of stannic oxide (Japanese Patent Application Kokai (Laid-Open) No. 50-29,627), and a process which comprises depositing on surface of a polymeric material stannic oxide or a compound containing stannic oxide by the vapor deposition method (Japanese Patent Application Kokai (Laid-Open) Nos. 54-11,369 and 58-172,810), etc. have hitherto been disclosed.

On the other hand as a technique for providing inorganic glass with antistatic property, a process is known which comprises spraying a solution containing stannic chloride onto the surface of inorganic glass heated at about 500° C. and thereby thermally decomposing the stannic chloride to form a coating film of stannic oxide (Japanese Patent Publication No. 34-626).

The above-mentioned prior techniques have the following problems for giving polymeric materials antistatic property. That is, the process which comprises mixing fine powders of stannic oxide with a polymer resin is disadvantageous in that the antistatic property can be obtained only by using a large amount of stannic oxide which deteriorates moldability and properties of the polymeric material resulting a greatly elevated cost. The process which comprises forming on the resin surface a coating film containing stannic oxide is disadvantageous in that, due to the high specific gravity of stannic oxide, stannic oxide powders precipitate so readily in the coating material that a uniform antistatic coating is difficult to obtain. The process which comprises depositing stannic oxide on surface of the polymeric material by the vapor deposition is disadvantageous in that the adhesion between the antistatic coating film and the polymeric material is not good and the process is applicable only to sheet-form materials such as film, plate and the like.

Further, the process which comprises depositing stannic chloride onto the surface of heated inorganic glass and thermally decomposing it is desadvantageous in that the process is not applicable to polymeric materials inferior in the heat resistivity.

Accordingly, it is objects of the present invention to overcome the above-mentioned disadvantages of prior arts for forming stannic oxide-containing polymeric surfaces, and further to provide a process for producing at a low cost an antistatic polymeric material having an antistatic property expressed by the surface electrical resistivity of $10^{10}$ Ω/□ order or less or by the half life time of 40 seconds or less.

Thus, the present invention is directed to a process for producing an antistatic polymeric material which comprises heating at a temperature of 60° C. to 140° C. a polymeric material moistened with an aqueous solution containing stannic chloride.

The polymeric material used in the present invention are those produced according to the usual techniques and selected from the group consisting of polyacrylonitrile resins, polymethyl (meth)acrylate resins, polyester resins, polyamide resins, polyvinylchloride resins, polystyrene resins, polyolefin resins, polycarbonate resins, ABS resins, melamine resins and cellulose acetate resins.

The shape of polymeric material is not critical, and may be any of particle, film, plate, molded article, fiber, yarn, cloth or the like.

In the invention, stannic chloride is used for the purpose of forming, in the surface layer part of the polymeric material, an electroconoductive layer composed of stannic oxide formed by the hydrolysis of stannic chloride, and preferable concentration of stannic chloride in the aqueous solution is 0.5 to 5% by weight. If the concentration of stannic chloride is lower than 0.5% by weight, it is difficult to give an antistiatic property to the polymeric material. If it is higher than 5% by weight, it brings about no marked improvement in the antistatic effect, only increasing the cost greatly. In the invention, it is preferable to use stannic chloride in combination with an inorganic acid salt selected from the group consisting of chlorides other than stannic chloride and nitrates. The inorganic acid salt used in combination with stannic chloride accelerates the formation of the electroconductive layer composed of stannic oxide in the surface layer part of the polymeric material. The inorganic acid salt usable for this purpose includes chlorides such as potassium chloride, sodium chloride, calcium chloride, magnesium chloride, zinc chloride, ammonium chloride and the like, and nitrates such as potassium nitrate, sodium nitrate, barium nitrate, ammonium nitrate and the like.

The preferable concentration of inorganic acid salt in the aqueous solution is 5 to 20% by weight. If the concentration of inorganic acid salt is lower than 5% by weight, no great effect of giving antistatic property on polymeric material can be exhibited. If the concentration is higher than 20% by weight, no marked effect on improving the antistatic property can be exhibited.

The combined use of stannic chloride with sulfates such as sodium sulfate, ammonium sulfate and the like, carbonates such as sodium carbonate, sodium hydrogen carbonate and the like, phosphates such as sodium phosphate, sodium dihydrogen phosphate and the like or organic acid salts such as sodium acetate, sodium tartrate and the like is undesirable, because it brings about no improving effect on the antistatic property and sometimes obstructs the antistatic effect.

In the invention, a polymeric material has to be heat-treated in a state moistened with an aqueous solution containing stannic chloride, and most generally the polymeric material is dipped in an aqueous solution containing stannic chloride and is heat-treated. Preferable temperatures of the heat-treatment are set at from 60° C. to 140° C, and preferable length of time for the heat-treatment is from 2 minutes to 60 minutes.

If the temperature of heat-treatment is lower than 60° C., it is difficult to give the polymeric material an antistatic property. A temperature higher than 140° C. is undesirable, because apparatuses used for the heat-treatment are restricted in many points by such a temperature. The times of heat-treatment necessary for giving the polymeric material an antistatic property becomes shorter as the temperature of heat treatment becomes higher. However, the temperature of heat treatment must be decided with consideration of heat resistivity of the polymeric material.

After the heat treatment, the treated polymeric material is washed with water and dried. The washing with water is carried out until the treating solution remained on the polymeric material surface turns to neutrality.

In carrying out the washing with water, it is also effective to carry out the washing with an alkaline aqueous solution containing sodium carbonate, sodium hydrogen carbonate, sodium hydroxide or the like, from the viewpoint of improving the efficiency of washing.

Drying may be carried out by usual drying means.

By the structural analysis, the surface layer part of the antistatic polymeric material obtained according to the invention has been proved that an electroconductive layer composed of stannic oxide is formed in the surface layer part.

As mentioned previously, an object of the present invention consists in providing a low-cost technique for producing antistatic polymeric materials. For this purpose, a low bath ratio treatment, i.e. a treatment at a low bath ratio (treating solution/material to be treated) using as small an amount of stannic chloride as possible, is preferably employed in giving antistatic property to polymeric materials because of the high price of stannic chloride. The low bath ratio treatment is quite effective also in the point that the bath ratio exercises only a small influence on the antistatic property.

A further development of the low bath ratio treatment is a process which comprises moistening the surface of polymeric material with the treating solution composed of an aqueous solution containing stannic chloride and then heating it with steam not to make the surface dryness. As a method for moistening the surface of polymeric material with the treating solution, there is a method which comprise dipping the polymeric material into the treating solution and then removing excessive treating solution with a squeezing mangle or centrifugal machine, a method which comprises spraying the treating solution onto the polymeric material surface by the use of spray gun, or the like. In these methods, the amount of treating solution rested on the surface is preferably in the range of 30 to 200% by weight of the polymeric material. If the amount of treating solution adhered to the surface is smaller than 30% by weight, the treating solution is apt to form spotty marks. If it is larger than 200% by weight, diffusion of steam into the inner area of polymeric material is restricted during the steam heat treatment, and the treating solution is wasted therewith.

The steam heat treatment is preferably carried out at a temperature of 60° C. to 140° C. for a period of 2 to 60 minutes in a steaming atmosphere under relative humidity of 70% or more. If the content of steam in the steam heat treatment is lower than 70% relative humidity, it is difficult to give the antistatic property to the polymeric material.

The times of steam heat treatment should be decided in connection with the temperature. If it is shorter than one minute, the antistatic property is difficult to obtain. If it exceeds 60 minutes, the prolongation of treating times is not accompanied by remarkable improvements in the antistatic property, so that is is undesirable. After the steam heat treatment, the polymeric material is thoroughly washed with water and dried. According to the present invention, there can be obtained an antistatic polymeric material having so excellent antistatic property as expressed by the surface resistivity of $10^{10}$ $\Omega/\square$ order or above, or the half life time of 40 seconds or less.

As mentioned above, an antistatic property can be given to polymeric materials according to the invention, which owes to the stannic oxide formed by the hydrolysis of stannic chloride which adheres tightly to the surface layer part of polymeric material to form an electroconductive layer exhibiting an antistatic property.

In this case, the antistatic property given to polymeric materials is somewhat dependent on the kind of polymeric materials. For example, in case of polymeric materials having a nitrile group such as a polyacrylonitrile resin, an excellent antistatic property is given by treating the polymeric material with an aqueous solution containing stannic chloride only, while to polymeric materials having no nitrile group there is a tendency toward difficult in giving the polymeric material an antistatic property by such a procedure.

On the other hand, when polymeric material is treated with an aqueous solution containing stannic chloride and other chloride or nitrate, an antistatic property can be given to nearly all kinds of polymeric materials without influence of the kind of polymeric materials.

The above-mentioned difference between nitrile group-having polymeric materials and nitrile group-free polymeric materials in the antistatic property-acquiring tendency through the aqueous solution containing stannic chloride only is due to the difference in the behavior of forming an electroconductive layer composed of stannic oxide on the surface of polymeric material. When a nitrile group-having polymeric material is treated with the aqueous solution containing stannic chloride only, the stannic ion is adsorbed onto the nitrile group in the polymeric material, which is subsequently oxidized to form stannic oxide and forms an electroconductive layer of stannic oxide in the surface layer part of polymeric material and thereby exhibits an antistatic property. On the other hand, when a polymeric material is treated with an aqueous solution containing stannic chloride and other chloride or nitrate, stannic oxide formed by hydrolysis of stannic chloride is directly adsorbed to the surface layer part of polymeric material to form an electroconductive layer composed of stannic oxide and thereby an antistatic property is exhibited. In the latter case, the stannic oxide formed during heat treatment by the hydrolysis of stannic chloride in the aqueous solution is succesively agglomerated from the monomolecular state to fine particles and ultimately to coarse particles.

The stannic oxide is adsorbed onto the surface layer part of polymeric material in the monomolecular state or in the state of fine particles, but it is hardly adsorbed in the state of coarse particles.

Accordingly, for adsorbing stannic oxide onto the surface layer part of polymeric material, stannic oxide formed in the aqueous solution must be retained in the state of monomolecule or fine particles for as long a period of time as possible. Inorganic acid salts used in the invention are considered that they prevent formation of the coarse particles from the stannic oxide resulting from the hydrolysis of stannic chloride and thereby accelerate the adsorption onto the surface layer part of polymeric material.

The present invention makes it possible to obtain an antistatic polymeric material by a relatively simple procedure, at a low cost, and regardless of shapes of polymeric material, and it is quite excellent as a production technique of antistatic polymeric materials in the field of electronic industry particularly requiring an antistatic property.

The present invention will be explained in more detail hereunder by reference to the following Examples. Antistatic property and durability of the antistatic property mentioned herein were measured by the following method.

(Antistatic property)

Antistatic property is expressed in terms of the surface electrical resistivity or half life time at 20° C. in an atmosphere having relative humidity of 40%, and they were measured by the following methods:

(1) Measurement of surface electrical resistivity

Using a super Megaohm-meter, Model SM-5 (apparatus for measuring electrical resistance, manufactured by Toa Electronics Ltd.), surface resistivity ($\Omega/\square$) of sample was measured at voltage of 1,000 V.

(2) Measurement of half life time

Using a static honest meter (manufactured by Shishido Co.), the half life (seconds) of charged static electrical quantity was measured according to JIS-L 1094.

(Durability of antistatic property)

Sample was subjected to the following treatment and thereafter its antistatic property was measured. By comparing antistatic properties before and after the treatment, durability was evaluated.

(1) Photo-irradiation

Using a fade-o-meter, sample was irradiated with light for 200 hours.

(2) Acid treatment

Sample was dipped in an aqueous solution containing 1% by weight of hydrochloric acid at 25° C. for 24 hours, and then washed with water and dried.

(3) Alkali treatment

Sample was dipped in an aqueous solution containing 1% by weight of sodium hydroxide at 25° C. for 24 hours, and then washed with water and dried.

(4) Solvent treatment

Sample was dipped in methyl alcohol at 25° C. for 24 hours and then washed with water and dried.

(5) Heat treatment in dryness

Sample was placed in a hot air oven and heated in dryness at 100° C. for 5 hours.

(6) Steam heat treatment

Sample was placed in a steamer, heated in the presence of saturated steam at 98° C. for 5 hours, and then dried.

(7) Wet heat treatment

Sample was subjected to wet heat treatment in hot water at 100° C. for 5 hours and then dried.

(8) Washing treatment

Using a domestic washing machine, sample was washed with a washing solution containing 2 g/liter of Zabu (neutral detergent, manufactured by Kao Corp.) at 40° C. for 5 minutes and thereafter washed with running water for one minute. After repeating this washing treatment 10 times, it was dehydrated by centrifugation and dried.

EXAMPLE 1

The grams of scoured knitted fabric of Silpalon 150d/60f (acrylic fiber, manufactured by Mitsubishi Rayon Co.) was dipped in 400 ml of an aqueous solution containing 0.5 to 5% by weight of stannic chloride ($5H_2O$) at 25° C. After elevating the temperature to 96° C. at a rate of 10° C./minute and subsequently heat treating the fabric at that temperature for 60 minutes, the fabric was thoroughly washed with water, dehydrated by centrifugation and then dried at 105° C. for 30 minutes by means of hot air oven.

The antistatic fiber thus obtained hardly exhibited deterioration of whiteness, and its whiteness was comparable to that of untreated acrylic fiber knitted fabric. Further, increase in weight of the fiber due to the antistatic treatment and the electrical resistivity of the knitted fabric thus obtained were measured to obtain the results shown in Table 1.

TABLE 1

| | | Stannic chloride ($5H_2O$) (% by wt.) | Increase in weight (%) | Electrical resistivity ($\Omega/\square$) |
|---|---|---|---|---|
| Referential Example | Experiment 1 | 0 | 0 | $1 \times 10^{12} <$ |
| Present Invention | Experiment 2 | 0.5 | 0.4 | $1 \times 10^{10}$ |
| Present Invention | Experiment 3 | 1 | 0.9 | $2 \times 10^9$ |
| Present Invention | Experiment 4 | 3 | 2.6 | $7 \times 10^8$ |
| Present Invention | Experiment 5 | 5 | 4.5 | $5 \times 10^8$ |

It is apparent from the results shown in Table 1 that acrylic fiber increases its weight, decreases its electrical resistivity and acquires antistatic property when heat treated in an aqueous solution containing stannic chloride.

In this case, the percent increase in fiber weight becomes greater and electrical resistivity of fiber decreases as concentration of stannic chloride increases. Further, the composition of surface layer part of the antistatic fiber was analyzed to ascertain the formation of an electroconductive layer composed of stannic oxide.

COMPARATIVE EXAMPLE 1

Sodium carbonate was slowly added to an aqueous solution containing 1% by weight of stannic chloride ($5H_2O$) (pH 0.93) until pH of the solution reached 6.9, whereby the stannic chloride was converted to stannic oxide hydrate. Ten grams of the same scoured knitted fabaric of acrylic fiber as used in Example 1 was dipped in 400 ml of the above-mentioned aqueous solution at 25° C. Then, in the same manner as in Example 1, temperature was elevated to 96° C. at a rate of 10° C./minute, and subsequently the fabric was heat treated at that temperature for 60 minutes, thoroughly washed with water, centrifuged, and dried in hot air oven at 105° C. for 30 minutes. The knitted fabric of acrylic fiber thus obtained showed no increase in weight due to the treatment. Its electrical resistivity was $1 \times 10^{12}$ Ω/□ or above, and no antistatic property could be given to the fabric.

It is apparent from the result that antistatic property can not be given to acrylic fiber at all when the acrylic fiber is directly treated with an aqueous solution containing stannic oxide.

EXAMPLE 2

The same scoured knitted fabric of acrylic fiber as used in Example 1 was dipped in an aqueous solution containing 2% by weight of stannic chloride ($5H_2O$) at 25° C., after which it was squeezed with squeezing mangle to adjust the amount of the treating solution involved in the fiber to 150% by weight.

Subsequently, the knitted fabric was placed in a steamer and steam treated with saturated steam at 98° C. for 10 minutes, after which it was washed with water by means of a washing machine until pH of the fiber surface reached neutrality, dehydrated by centrifugation, and dried by means of hot air oven at 105° C. for 30 minutes.

The antistatic treatment hardly brought about decrease in whiteness of the fiber, and whiteness of the fiber was comparable to that of untreated knitted fabric of acrylic fiber.

The antistatic knitted fabric of acrylic fiber thus obtained had an electrical resistivity of $1 \times 10^9$ Ω/□, demonstrating its excellency in antistatic property.

EXAMPLE 3

A scoured knitted fabric of Kanekalon (modacrylic fiber, manufactured by Kanegafuchi Chem. Ind. Co.) was subjected to an antistatic treatment by the same procedure as in Example 2. The knitted fabric of modacrylic fibuer thus obtained had an electrical resistivity of $3 \times 10^9$ Ω/□, demonstrating its excellency in antistatic property.

Before the antistatic treatment, the scoured knitted fabric had an electrical resistivity of $1 \times 10^{12}$ Ω/□ or above, demonstrating that it had no antistatic property.

EXAMPLE 4

Various resin plates having a thickness of 2 mm were dipped in an aqueous solution containing 2% by weight of stannic chloride ($5H_2O$) and 10% by weight of sodium chloride at 25° C. While stirring the aqueous solution, its temperature was elevated to 70° C. at a rate of 10° C./minute. Subsequently, the resin plates were heat treated at 70° C. for one hour, washed with water, dehydrated and dried at 60° C. for 30 minutes. Electrical resistivities of the resin plates were measured to obtain the results shown in Table 2.

TABLE 2

| Resin plate | Electrical resistivity (Ω/□) |
| --- | --- |
| Polymethylmethacrylate resin | $6 \times 10^9$ |
| Polyester resin | $5 \times 10^9$ |
| Polyvinylchloride resin | $6 \times 10^9$ |
| Polystyrene resin | $5 \times 10^9$ |
| Polypropylene resin | $6 \times 10^9$ |
| Polycarbonate resin | $5 \times 10^9$ |
| ABS resin | $2 \times 10^9$ |

It is apparent from Table 2 that all the resin plates thus treated had an excellent antistatic property. Before the antistatic treatment, all the resin plates had an electrical resistivity of $1 \times 10^{12}$ Ω/□ or above, demonstrating that they had no antistatic property.

EXAMPLE 5

Ten grams of fine particulate acrylonitrile resin prepared by copolymerizing 93% by weight of acrylonitrile and 7% by weight of vinyl acetate and having a mean particle diameter of 60 μm was dipped in 200 ml of an aqueous solution containing 2% by weight of stannic chloride ($5H_2O$) and 10% by weight of sodium chloride at 25° C. With stirring, temperature was elevated to 96° C. at a rate of 10° C./minute. Subsequently, the resin was heat treated at 96° C. for 30 minutes, collected by filtration by means of Buchner funnel with a filter paper, repeatedly washed with water until neutrality was reached, and then dried by means of hot air oven at 105° C. for 120 minutes.

In order to evaluate the antistatic property of the fine particulate resin, 1 g of the resin was introduced into the cylindrical container of press molding machine having a diameter of 2 mm and pressed under a pressure of 500 kg/3.14 $cm^2$, at 25° C. for one minute to prepare a cylindrical press-molded product, and its electrical resistivity was measured.

As the result, its electrical resistivity was $1 \times 10^8$ Ω/□, demonstrating its excellency in antistatic property.

EXAMPLE 6

Twenty grams of Sumitex Resin M3 (trimethylolmelamine, manufactured by Sumitomo Chemical Co.) and 2 g of ammonium chloride were dissolved into 1,000 ml of water. With stirring, the solution was heated to 96° C. at a rate of 10° C./minute and subsequently heated at that temperature for 10 minutes to form a resin. Then, the product was washed with water, dehydrated and dried to obtain a fine particulate melamine resin having a mean particle diameter of 30 μm.

Ten grams of this fine particulate melamine resin was introduced into 200 ml of an aqueous solution containing 4% by weight of stannic chloride ($5H_2O$) and 10% by weight of sodium chloride at 25° C. With stirring, temperature was elevated to 96° C. at a rate of 10° C./minute, and subsequently the resin was heat treated at 96° C. for 30 minutes, after which it was collected by filtration by means of Buchner funnel with a filter paper, repeatedly washed with water and dried by means of hot air oven at 105° C. for 120 minutes to obtain a white-colored fine particulate resin.

In order to evaluate the antistatic property of the fine particulate resin, it was formed into a cylindrical press-molded product in the same manner as in Example 5, and its electrical resistivity was measured.

As the result, its electrical resistivity was $8 \times 10^7$ Ω/□, demonstrating its excellency in antistatic property.

EXAMPLE 7

A scoured knitted fabric prepared from Soluna 150d/48f (polyester fiber, manufactured by Mitsubishi Rayon Co.) was dipped in an aqueous solution containing 2% by weight of stannic chloride ($5H_2O$) and 10% by weight of the hydrochloride shown in Table 3 at 25° C., after which it was squeezed by means of mangle to adjust the treating solution involved in the fiber to 140% by weight.

Subsequently, the knitted fabric was introduced into a steamer and heat treated with saturated steam at 98° C. for 30 minutes, after which it was thoroughly washed with water, dehydrated by centrifugation, and dried by means of hot air oven at 105° C. for 30 minutes. Half life time of the polyester knitted fabric thus obtained was measured. The results are shown in Table 3.

TABLE 3

| Hydrochloride | Half life time (seconds) |
|---|---|
| Potassium chloride | 9 |
| Sodium chloride | 8 |
| Calcium chloride (6H$_2$O) | 9 |
| Magnesium chloride (6H$_2$O) | 10 |
| Zinc chloride | 12 |
| Ammonium chloride | 10 |

It is apparent from Table 3 that all the polyester knitted fabrics which had been wet heat treated with an aqueous solution containing stannic chloride and hydrochloride showed an excellent antistatic property, regardless of the kind of the hydrochloride.

EXAMPLE 8

A scoured knitted fabric prepared from Soluna 150d/48f (polyester fiber, manufactured by Mitsubishi Rayon Co.) was dipped in an aqueous solution containing 2% by weight of stannic chloride (5H$_2$O) and 10% by weight of the nitrate shown in Table 4 at 25° C., after which it was squeezd by means of squeezing mangle to adjust the amount of treating solution involved in the fiber to 140% by weight. Subsequently, the knitted fabaric was introduced into a steamer and heat treated with saturated steam at 98° C. for 30 minutes, thoroughly washed with water, dehydrated by centrifugation and dried by means of hot air oven at 105° C. for 30 minutes. Then, half life times of the polyester knitted fabrics thus obtained were measured to obtain the results shown in Table 4.

TABLE 4

| Nitrate | Half life time (seconds) |
|---|---|
| Potassium nitrate | 13 |
| Sodium nitrate | 13 |
| Barium nitrate | 15 |
| Ammonium nitrate | 18 |

It is apparent from Table 4 that all the polyester knitted fabrics which had been wet heat treated with aqueous solution containing stannic chloride and nitrate had an excellent antistatic property, regardless of the kind of nitrate.

COMPARATIVE EXAMPLE 2

A scoured knitted fabric prepared from Soluna 50d/48f (polyester fiber, manufactured by Mitsubishi Rayon Co.) was dipped in an aqueous solution containing 2% by weight of stannic chloride (5H$_2$O) and 10% by weight of the inorganic acid salt shown in Table 5 at 25° C., after which it was squeezed by means of squeezing mangle to adjust the amount of the treating solution involved in the fiber to 140% by weight. Subsequently, the knitted fabric was introduced into a steamer and heat treated with saturated steam at 98° C. for 30 minutes, after which it was thoroughly washed with water, dehydrated by centrifugation and dried by means of hot air oven at 105° C. for 30 minutes. Half life times of the polyester knitted fabrics thus obtained were measured The results are shown in Table 5.

TABLE 5

| Inorganic acid salt | Half life time (seconds) |
|---|---|
| Sodium sulfate (10H$_2$O) | 120< |
| Magnesium sulfate (7H$_2$O) | " |
| Aluminum sulfate (18H$_2$O) | " |
| Manganese sulfate (7H$_2$O) | " |
| Iron sulfate (9H$_2$O) | " |
| Zinc sulfate (7H$_2$O) | " |
| Ammonium sulfate | " |
| Potassium phosphate | " |
| Dipotassium hydrogen phosphate | " |
| Potassium dihydrogen phosphate | " |
| Sodium hydrogen phosphate | " |
| Ammonium phosphate (3H$_2$O) | " |
| Sodium carbonate | " |
| Sodium hydrogen carbonate (10H$_2$O) | " |

It is apparent from Table 5 that polyester fabric which has been wet heat treated with an aqueous solution containing a combination of stannic chloride and an inorganic acid salt other than hydrochlorides and nitrates shows an antistatic property.

COMPARATIVE EXAMPLE 3

Ten grams of a scoured knitted fabric prepared from Bonnel V17B2d (acrylic fiber, manufactured by Mitsubishi Rayon Co.) was dipped in 400 ml of an aqueous treating solution containing 2% by weight of stannic chloride (5H$_2$O) and 10% by weight of the organic acid salt shown in Table 6 at 25° C. Subsequently, temperature was elevated to 96° C. at a rate of 10 minutes/minute and the fabric was wet heat treated at 96° C. for 30 minutes, after which it was thoroughly washed with water, dehydrated by centrifugation and dried by means of hot air oven at 105° C. for 30 minutes.

Half life times of the acrylic fiber knitted fabrics treated with the organic acid salts are shown in Table 6. When the same procedure as above was repeated without using organic acid salt, the acrylic fiber knitted fabric showed a half life time of 7 seconds.

TABLE 6

| Organic acid salt | Antistatic effect (Half life time) (seconds) |
|---|---|
| Sodium acetate | 120< |
| Sodium tartrate | 120< |
| Sodium glycolate | 120< |
| Sodium succinate | 120< |

It is apparent from Table 6 that, if a fabric is wet heat treated with a treating solution containing stannic chloride and organic acid salt, no antistatic property can be given at all. In other words, combined use of organic acid salt is undesirable.

EXAMPLE 9

A scoured knitted fabric prepared from Soluna 150d/48d (polyester fiber, manufactured by Mitsubishi Rayon Co.) was dipped in an aqueous solution containing stannic chloride (5H$_2$O) and sodium chloride under the conditions shown in Table 7 at 25° C., after which it was squeezed by means of squeezing mangle to adjust the amount of treating solution involved in the fiber to 140% by weight. Subsequently, the knitted fabric was introduced into a steamer and steam treated with saturated steam, after which it was thoroughly washed with water, dehydrated by centrifugation and dried by means of hot air oven at 105° C. for 30 minutes. Electrical resistivity of the polyester knitted fabric thus obtained was measured.

Table 7 demonstrates the relation between the conditions of antistatic treatment of polyester knitted fabric and the electric resistivity.

steamer and steam heat treated for 30 minutes with saturated steam at 98° C.

Then, the fabrics were washed with water, and dipped into an aqueous solution containing 0.5% by weight of sodium hydrogen carbonate at 25° C. for 5 minutes to neutralize the acid present in the fabrics. Then, they were thoroughly washed with running water, dehydrated by centrifugation and dried by means of

TABLE 7

|  |  | Composition of treating solution | | Steam heat treatment | |  |
| --- | --- | --- | --- | --- | --- | --- |
|  |  | Stannic chloride ($5H_2O$) (% by wt.) | Sodium chloride (% by wt.) | Temperature (°C.) | Time (min.) | Electrical resistivity ($\Omega/\square$) |
| Comparative Example | Experiment 1 | 0 | 0 | 98 | 30 | $1 \times 10^{12} <$ |
| Present invention | Experiment 2 | 0.5 | 10 | 98 | 30 | $4 \times 10^{10}$ |
| Present invention | Experiment 3 | 1 | 10 | 98 | 30 | $2 \times 10^9$ |
| Present invention | Experiment 4 | 2 | 10 | 98 | 30 | $2 \times 10^9$ |
| Present invention | Experiment 5 | 5 | 10 | 98 | 30 | $2 \times 10^9$ |
| Comparative Example | Experiment 6 | 2 | 0 | 98 | 30 | $1 \times 10^{12} <$ |
| Present invention | Experiment 7 | 2 | 5 | 98 | 30 | $8 \times 10^9$ |
| Present invention | Experiment 8 | 2 | 15 | 98 | 30 | $2 \times 10^9$ |
| Present invention | Experiment 9 | 2 | 20 | 98 | 30 | $2 \times 10^9$ |
| Comparative Example | Experiment 10 | 2 | 10 | 30 | 30 | $1 \times 10^{12} <$ |
| Present invention | Experiment 11 | 2 | 10 | 60 | 30 | $3 \times 10^{10}$ |
| Present invention | Experiment 12 | 2 | 10 | 90 | 30 | $3 \times 10^9$ |
| Present invention | Experiment 13 | 2 | 10 | 98 | 2 | $6 \times 10^{10}$ |
| Present invention | Experiment 14 | 2 | 10 | 98 | 5 | $3 \times 10^9$ |
| Present invention | Experiment 15 | 2 | 10 | 98 | 10 | $2 \times 10^9$ |
| Present invention | Experiment 16 | 2 | 10 | 98 | 20 | $2 \times 10^9$ |

EXAMPLE 10

Scoured knitted fabrics of various commercial fibers (acrylic fiber, triacetate fiber, polypropylene fiber, polyester fiber and polyamide fiber) were dipped in an aqueous solution containing 2% by weight of stannic chloride ($5H_2O$) and 10% by weight of sodium chloride at 25° C., after which the fabrics were squeezed by means of squeezing mangle to adjust the amount of the treating solution involved in the fabric to 100 to 150% by weight. Then, the fabrics were introduced into a steamer and steam heat treated at 98° C. for 30 minutes with saturated steam... hot air oven at 105° C. for 30 minutes.

In order to evaluate the antistatic properties and durabilities of antistatic property of the knitted fabrics thus obtained, an untreated fabric, a fabric which had been subjected to the antistatic treatment and fabrics which had been prepared by subjecting the antistatic fabric to various durability-improving treatments were measured on half life time to obtain the results shown in Table 8.

TABLE 8

| Sample | | Fiber | | | | |
| --- | --- | --- | --- | --- | --- | --- |
|  |  | Acrylic fiber | Triacetate fiber | Polypropylene fiber | Polyester fiber | Polyamide fiber |
| Original fabric | Untreated | (seconds) 120< | (seconds) 120< | (seconds) 120< | (seconds) 120< | (seconds) 120< |
|  | Antistatic treatment | 5 | 7 | 7 | 8 | 6 |
| Fabrics subjected to durability-improving treatments | Photo-irradiation | 8 | 10 | 10 | 10 | 6 |
|  | Acid treatment | 7 | 7 | 8 | 11 | 6 |
|  | Alkali treatment | 5 | 8 | 8 | 10 | 6 |
|  | Solvent treatment | 5 | 7 | 7 | 8 | 6 |
|  | Heat treatment in dryness | 10 | 9 | 11 | 15 | 8 |
|  | Steam heat treatment | 8 | 8 | 9 | 14 | 13 |
|  | Wet heat treatment | 8 | 10 | 7 | 13 | 15 |
|  | Washing treatment | 15 | 24 | 22 | 25 | 35 |

It is apparent from Table 8 that, in all the fibers, the untreated fabric had a half life time of 120 seconds or longer, showing no antistatic property, while the fabrics having been subjected to antistatic treatment had a half life time of 40 seconds or shorter, demonstrating that they had acquired an antistatic property.

It is also apparent that all the antistatic fabrics which had been subjected to the various durability-improving treatments showed an excellent permanent antistatic property.

We claim:

1. A process for producing an antistatic polymeric material which comprises heat-treating a polymeric material at a temperature of 60° C. to 140° C. moistened with an aqueous solution containing 0.5 to 5% by weight stannic chloride and 5 to 20% by weight of an inorganic acid salt selected from the group consisting of chlorides other than stannic chloride and nitrates.

2. A process according to claim 1, wherein the polymeric material is heat-treated after dipping it in the aqueous solution.

3. A process according to claim 1, wherein the aqueous solution is rested on the polymeric material to be heat-treated.

4. A process according to claim 1, wherein the polymeric material is selected from the group consisting of polyacrylonitrile resins, polymethyl (meth) acrylate resins, polyester resins, polyamide resins, polyvinylchloride resins, polystyrene resins, polyolefin resins, polycarbonate resins, ABS resins, melamine resins and cellulose acetate resins.

* * * * *